United States Patent [19]

Takekoshi et al.

[11] 3,905,942

[45] Sept. 16, 1975

[54] METHOD FOR MAKING POLYETHERIMIDES AND PRODUCTS PRODUCED THEREBY

[75] Inventors: Tohru Takekoshi, Scotia, N.Y.; John E. Kochanowski, Pittsfield, Mass.

[73] Assignee: General Electric Company, Schenectady, N.Y.

[22] Filed: Sept. 13, 1974

[21] Appl. No.: 505,635

Related U.S. Application Data

[63] Continuation of Ser. No. 372,770, June 22, 1973, abandoned.

[52] U.S. Cl. ............... 260/47 CP; 260/49; 260/65; 260/78 TF
[51] Int. Cl.² ......................................... C08G 73/10

[58] Field of Search.......... 260/47 CP, 65, 49, 78 TF

[56] References Cited
UNITED STATES PATENTS
3,699,075   10/1972   Lubowitz .............................. 260/49

*Primary Examiner*—Lester L. Lee
*Attorney, Agent, or Firm*—William A. Teoli; Joseph T. Cohen; Jerome C. Squillaro

[57] ABSTRACT

A method is provided for making polyetherimides involving the reaction of aromatic bis(etherdicarboxylic) acids and organic diamines in the presence of a non-polar organic solvent, or phenolic solvent, at temperatures of at least 130°C. The polyetherimides are useful as injection molding compounds.

13 Claims, No Drawings

METHOD FOR MAKING POLYETHERIMIDES AND PRODUCTS PRODUCED THEREBY

This is a continuation of application Ser. No. 372,770, filed June 22, 1973, now abandoned.

The present invention relates to polyetherimides which can be made by effecting reaction between an aromatic bis(etherdicarboxylic) acids and an organic diamine in an organic solvent at an elevated temperature.

Prior to the present invention, polyimides derived from the reaction of organic dianhydrides and organic diamines were generally thermoset and made by producing an intermediate polyamide acid. As shown by Edwards U.S. Pat. No. 3,179,614, the polyamide acid is preferably obtained by reacting the organic dianhydride and the organic diamine with a dipolar aprotic solvent at temperatures of 50°C or below. One of the reasons for careful temperature control is that premature formation of water of reaction leads to depolymerization of polymer. In addition imidization occurs as soon as the temperature exceeds optimum limits which can decrease polymer solubility and solution shelf life.

The present invention is based on the discovery that certain aromatic bis(etherdicarboxylic) acids, or "tetra-carboxylic acids" included by the formula

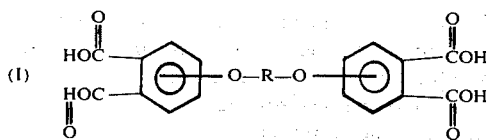

can be reacted with organic diamine included by the formula,

at temperatures of at least 130°C in the presence of organic solvent to provide thermoplastic polyetherimide, where R is a member selected from the class consisting of a. divalent organic radicals of the formulas,

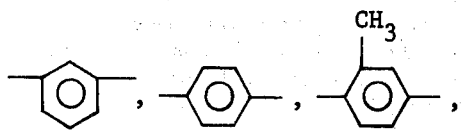

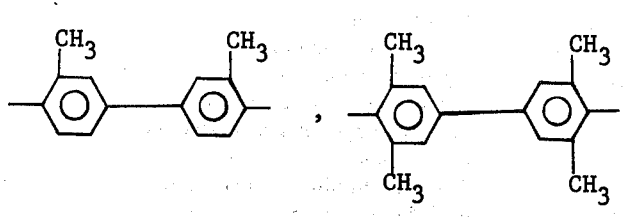

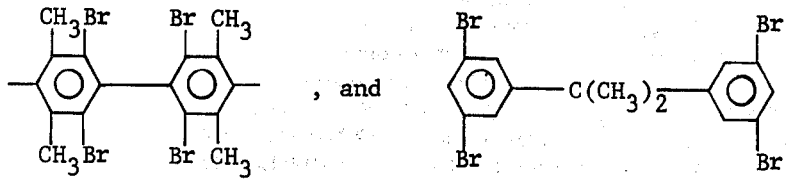

and b. divalent organic radicals included by the formula,

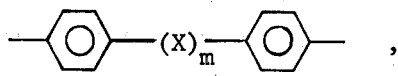

where X is a member selected from the class consisting of divalent radicals of the formulas $-C_yH_{2y}-$,

$-O-$ and $-S-$, where $m$ is 0 or 1, $y$ is a whole number from 1 to 5, and $R^1$ is a divalent organo radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxane cycloalkylene radicals having from 2-20 carbon atoms, and (c) divalent radicals included by the formula,

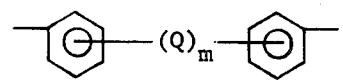

where Q is a member selected from the class consisting of $-O-$,

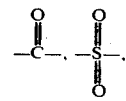

$-S-$, and $-C_xH_{2x}-$, $x$ is a whole number from 1 to 5 inclusive, and $m$ is as previously defined.

The method for making polyetherimide in accordance with the invention comprises, 1. effecting reaction between aromatic bis(etherdicarboxylic) acid of formula I and organic diamine of formula II in the presence of a non-polar organic solvent or phenolic solvent at temperatures of at least 130°C while effecting the removal of water of reaction, and 2. separating polyetherimide from the resulting mixture of (1).

Included by the aromatic bis(etherdicarboxylic) acids of formula I are compounds having the formulas,

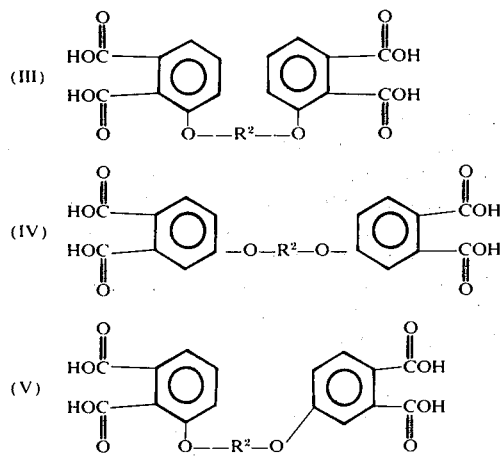

where $R^2$ is

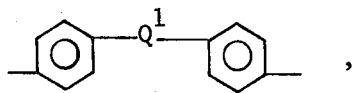

and $Q^1$ is selected from —O—, —S—, and

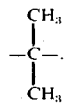

Tetracarboxylic acids included by formula III are, for example,
2,2-bis[4-(2,3-dicarboxyphenoxy)phenyl]propane;
4,4'-bis(2,3-dicarboxyphenoxy)diphenyl ether;
1,3-bis(2,3-dicarboxyphenoxy)benzene;
4,4'-bis(2,3-dicarboxyphenoxy)diphenyl sulfide;
1,4-bis(2,3-dicarboxyphenoxy)benzene, etc.

Tetracarboxylic acids included by formulas IV and V are, for example,
2,2-bis[4-(3,4-dicarboxyphenoxy)phenyl]propane;
4,4'-bis(3,4-dicarboxyphenoxy)diphenyl ether;
4,4'-bis(3,4-dicarboxyphenoxy)diphenyl sulfide;
1,3-bis(3,4-dicarboxyphenoxy)benzene;
1,4-bis(3,4-dicarboxyphenoxy)benzene;
4-(2,3-dicarboxyphenoxy)-4'(3,4-dicarboxyphenoxy)diphenyl-2;2-propane, etc.

Some of the aromatic bis(ether dicarboxylic) acids of formula I are shown in copending application of Darrell Heath and Joseph Wirth, Ser. No. 281,749, filed Aug. 18, 1972, and assigned to the same assignee as the present invention. These tetra-acids can be prepared from the hydrolysis of the reaction product of a nitro-substituted phenyl dinitrile with a metal salt of a dihydric phenol compound in the presence of a dipolar aprotic solvent. For example, a benzenoid compound of the formula,

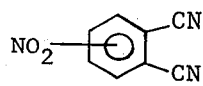

where the $NO_2$ group can be positioned anywhere in the benzene ring, can be reacted in dimethylformamide with an alkali metal salt of a dihydric phenol of the general formula, $$Alk—O—R^2—O—Alk$$

where $R^2$ is a divalent aromatic radical and Alk is an alkali metal ion. Various well known procedures can be used to convert the resulting tetranitriles to the corresponding tetra-acids. Another procedure for making the aromatic bis(etherdicarboxylic) acids of formula I is shown in copending application, Ser. No. 346,473, of Darrell Heath and Tohru Takekoshi, filed Mar. 30, 1973, and assigned to the same assignee as the present invention. An N-substituted nitrophthalimide is reacted with an alkali diphenoxide to produce an intermediate aromatic bis(etherphthalimide). Hydrolysis of the aromatic bis(etherphthalimide) to the tetra-acid salt followed by acidification results in the production of the tetra-acid.

Included by the alkali metal salts of the above described dihydric phenols are sodium and potassium salts of the following dihydric phenols:
2,2-bis(2-hydroxyphenyl)propane;
2,4'-dihydroxydiphenylmethane;
bis-(2-hydroxyphenyl)methane;
2,2-bis(4-hydroxyphenyl)propane hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3'-dimethylbiphenyl;
2,4'-dihydroxybenzophenone;
4,4'-dihydroxydiphenyl sulfoxide;
4,4'-dihydroxydiphenyl sulfide;
3,4'-dihydroxydiphenylmethane;
4,4'-dihydroxybenzophenone;
4,4'-dihydroxydiphenyl ether;
hydroquinone;
resorcinol; etc.

Included by the organic diamines of formula II are, for example,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;

4,4'-diaminodiphenylbenzophenone;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

Some of the non-polar organic solvents which can be employed alone or as a mixture to effect reaction between aromatic bis(etherdicarboxylic) acids of formula I and organic diamines of formula II are, for example, benzene, toluene, xylene, ethylbenzene, propylbenzene, chlorobenzene, dichlorobenzenes, trichlorobenzenes, biphenyl, terphenyl, acetophenone, benzophenone, nitrobenzene, anisole, phenetole, diphenyl ether, diphenyl sulfide, chlorinated biphenyls, chlorinated diphenylethers, dichloroethane, tetrachloroethane, trichloroethylene, tetrachloroethylene, methylcyclohexane, octane, isooctane, decane, etc.

Some of the phenolic solvents which can be used in the practice of the invention are phenol, o-, p- and m-chlorophenol; o-, p-, and m-cresol and mixtures thereof known as cresylic acid; mixtures of phenol and cresylic acid; ethyl phenols, isopropyl phenols, tert-butyl phenols, xylenols, phenylphenol, etc.

The polyetherimide reaction products of aromatic bis(etherdicarboxylic) acids of formula I and organic diamines of formula II are soluble in certain organic solvents and can be cast from an organic solvent solution to a thermoplastic film. These polyetherimides can be molded at temperatures up to 400°C. A preferred class of injection moldable materials are polyetherimide reaction products of organic diamines of formula II and aromatic bis(etherdicarboxylic) acids of formulas III–V. These injection moldable materials can be molded at temperatures of between 200° to 400°C and are soluble in organic solvents such as methylene chloride, chloroform, N,N-dimethylformamide, N,N-dimethylacetamide, meta-cresol, etc.

The above described moldable reaction products can be reinforced with conventional silica fillers for example, perlite, fume silica, etc., carbon whiskers, glass fibers, etc., at proportions of from 10 to 60 parts of filler, per 100 parts of polyetherimide.

In the practice of the method of invention, reaction is effected between the aromatic bis(etherdicarboxylic) acid and the organic diamines in the presence of an inert organic solvent, which hereinafter will signify either the above described non-polar or phenolic solvent.

The order of addition of either reactants is not critical. It is preferred to effect the reaction of the tetra-acid and the organic diamine in an inert atmosphere such as nitrogen. Experience has shown that sufficient organic solvent can be utilized to provide a solids content in the range of between 1 to 90%. Reaction can be effected at a temperature of from 130° to 300°C, and preferably 150° to 250°C.

In order to provide optimum contact between the aromatic bis(etherdicarboxylic) acid and the organic diamine, the reaction mixture can be agitated such as by stirring, etc. Substantially equal moles of reactants have been found to provide for optimum molecular weight of polymer; however, there can be employed from 0.5 to 2 moles and preferably 0.9 to 1.1 moles of aromatic bis(etherdicarboxylic) acid per mole of organic diamines for effective results. It has been found that the polyetherimide can have from about 5 to 500 repeating aromatic bis(etherdicarboxylic) acid-organic diamine reaction product units and preferably 10 to 50. Terminal amino or phthalic acid end groups can be present.

Reaction time of the tetra-acid of formula I and the organic diamine of formula II can vary from 0.5 to 20 hours depending upon such factors as the temperature employed, degree of stirring, nature of the reactants, solvents employed, etc.

During the course of polymer formation, water of reaction is continuously removed. The course of the reaction can be readily determined by the actual amount of water generated, as a percentage of the theoretical. In particular instances, a mixed solvent system can be employed consisting of a low boiling azeotropic solvent and a higher boiling solvent.

At the termination of the reaction, recovery of polyetherimide can be effected by pouring the polymer solution upon cooling into a precipitant such as methanol etc., followed by washing, filtering, etc.

In order that those skilled in the art will be able to practice the invention, the following examples are given by way of illustration and not by way of limitation. All parts are by weight.

EXAMPLE 1

The tetra-acid, 2,2-bis[4-(3,4-dicarboxyphenoxy)-phenyl]propane was prepared from the corresponding bisimide by base hydrolysis followed by acidification of the corresponding salt with a mineral acid. The aforementioned bis-imide was prepared from the corresponding N-phenol-4-nitrophthalimide with a sodium diphenoxide salt of bisphenol-A in accordance with the following procedure:

A mixture of 29.8g (0.131 mol) of bisphenol-A, 10.44g of sodium hydroxide in the form of a 50% aqueous solution, 250 cc of dimethylsulfoxide, and 66 cc of toluene was stirred in a nitrogen atmosphere at reflux for 7 hours. Final drying was effected by refluxing the toluene over a recirculating trap filled with calcium hydride. The toluene was removed by distillation and the reaction mixture was cooled to 60°C. Then 70.0g (0.26 mol) of N-phenyl-4-nitrophthalimide and 250 cc of dimethylsulfoxide were added; the resulting solution was stirred at 60°C for 45 minutes. There was added 25 cc of glacial acetic acid; the reaction mixture was then diluted with 1400g of water. A fine solid separated; it was isolated by filtration, washed with water, and dried. After recrystallization from acetonitrile and from benzene there was obtained 44.4g of white needles, m.p. 214°C. Anal. Calcd. for $C_{43}H_{30}N_2O_6$: C, 77.0; H, 4.51; N, 4.18. Found: C, 76.7; H, 4.5; N, 4.1. Based on method of preparation and elemental analysis the product was 2,2-bis[4-(N-phenylphthalimid-4-oxy)phenyl]propane.

A mixture of 60.2g of 2,2-bis[4-(N-phenylphthalimid-4-oxy(phenyl]propane, 57.37g of an aqueous 50% sodium hydroxide solution, and 350 cc of water was heated for 25 hours at 160°–175°C under 150 psi pressure. The mixture was then steam distilled for 45 minutes. The aqueous residue was acidified with hydrochloric acid. A product separated from the aqueous solution, which was washed with water and recrystallized from 50% acetic acid. There was obtained 32.9g of product; m.p. 208°–216°C. Anal Calcd. for $C_{31}H_{24}O_{10}$: C, 66.9; H, 4.3. Found: C, 66.5; H, 4.4. Based on method of preparation and elemental analysis, there was obtained 2,2-bis[4-(3,4-dicarboxyphenoxy)phenyl]propane.

Substantially equal molar amounts of the above tetra-acid and 4,4'-diaminodiphenylether were heated to reflux (140°C) for 4 hours under a nitrogen atmosphere in the presence of ortho-dichlorobenzene and toluene. The aforementioned mixed solvent system was employed at approximately a 3:1 volume ratio of ortho-dichlorobenzene to toluene which was employed in an amount sufficient to provide for a polymerization mixture having about 90% weight of solvents. After the toluene had been removed by distillation the mixture was heated for an additional 2½ hours at 182°C. The mixture was then allowed to cool to room temperature and the polymer was precipitated in methanol. There was obtained a 94% yield of polymer having an intrinsic viscosity in dimethylformamide of 0.40. Based on method of preparation the polymer was a polyetherimide having the following repeating unit:

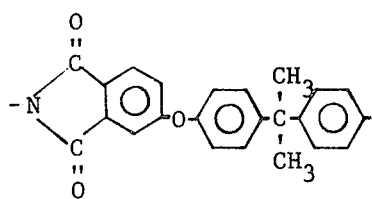

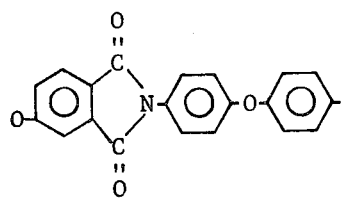

EXAMPLE 2

Following the procedure of Example 1, 2,2-bis[4-(N-phenylphthalimid-3-oxy)phenyl]propane was hydrolyzed in the presence of aqueous alkalai at 170°C (115 psi) to form in 97% yield the corresponding tetra-acid. Anal. Calcd. for $C_{31}H_{24}O_{10}$: C, 66.9; H, 4.3. Found: C, 66.5; H, 4.5. Based on the method of preparation, the product was 2,2-bis(4-(2,3-dicarboxyphenoxy)-phenyl]propane.

A mixture of 3.000 parts of the above tetra-acid, 1.068 parts of 4,4'-diaminodiphenylmethane, 0.40 parts of m-cresol and 5 parts of toluene was heated to reflux of 2 hours. Water formed during the reaction was continuously removed by azeotropic distillation. The resulting viscous reaction mixture was poured into methanol. A product precipitated. The product had an intrinsic viscosity of 0.71 in dimethylformamide, and a glass transition temperature of 232°C. Based on the method of preparation, the product was a polyetherimide having a molecular structure represented by the following repeating unit,

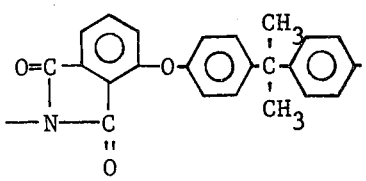

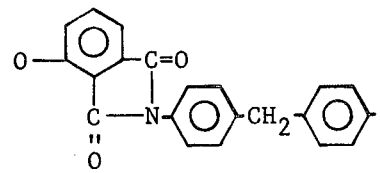

EXAMPLE 3

In accordance with the above procedure, 4,4'-(N-phenylphthalimid-4-oxy)diphenyl sulfide was hydrolyzed to form the corresponding tetra-acid at a 94% yield. The melting point was 111°–120°C (dec.).

A mixture of 5.565 parts of 4,4'-bis(3,4-dicarboxyphenoxy)diphenyl sulfide, 1.162 part of hexamethylenediamine, 40 parts of trichlorobenzene and 5 parts of toluene was heated to reflux for 3 hours during which time the water formed was removed as an azeotropic mixture. On cooling, product precipitated. The reaction was diluted with 200 parts of methanol and the product was isolated by filtration. The yield of product was 96%. Based on the method of preparation the product was a polyetherimide consisting essentially of the following repeating units,

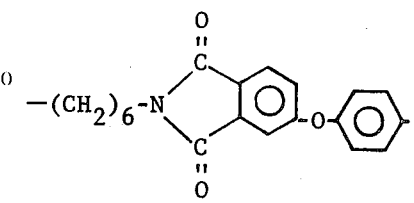

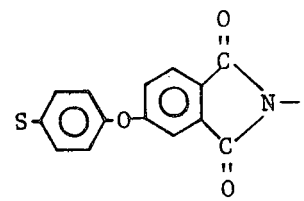

EXAMPLE 4

Following the procedure of example 1, 1,4-bis(N-phenylphthalimid-4-oxy)benzene was hydrolyzed to form the tetra-acid at 97% yield. On heating, the product dehydrated at 200°–210°C and melted at 262°–265°C. Based on the method of preparation, the product was 1,4-bis(3,4-dicarboxyphenoxy)benzene.

A mixture of 4.343 parts of the above tetra-acid, 2.700 parts of bis(4-aminobutyl)tetramethyldisiloxane, 50 parts of phenol and 10 parts of toluene was heated to reflux for 1 hour, during which time the water formed was continuously removed by azeotropic distillation. A fibrous yellow product was isolated by precipitation in methanol. Anal. Calc. for $C_{34}H_{38}N_2Si_2O_7$: C, 63.5 H, 6.0; N, 4.4; Si, 8.7. Found: C, 63.1; H, 6.3; N, 4.8; Si, 9.4. The product had a transition temperature of 52°. Based on the above analysis and the method of preparation, the product was a polyetherimide consisting essentially of the following repeating unit,

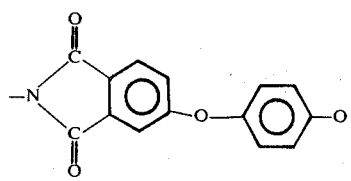

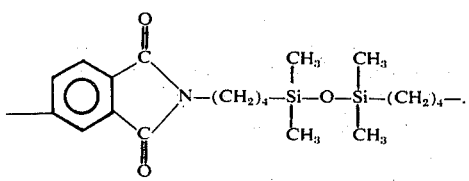

EXAMPLE 5

Employing a temperature of 180°C, 4,4'-bis(N-phenylphthalimid-3-oxy)diphenyl ether was hydrolyzed with aqueous sodium hydroxide under pressure. After acidification of the reaction mixture, a white product precipitated. It was filtered, washed and dried. The material melted at 252°–255°. Based on the method of preparation the product was 4,4'-bis(2,3-dicarboxyphenoxy)diphenyl ether.

A mixture of 5.304 parts of the above tetra-acid, 1.081 parts m-phenylenediamine, 40 parts of phenol and 10 parts of toluene was stirred and heated to reflux for 1.5 hours during which time the water formed was removed by azeotropic distillation. The resulting viscous solution was poured in methanol and white fibrous product was collected by filtration. The yield was 97%. The intrinsic viscosity of the product in m-cresol was 0.34 dl/g. The product had a glass transition temperature of 234°C. Based on method of preparation, the product was a polyetherimide consisting essentially of the following repeating unit,

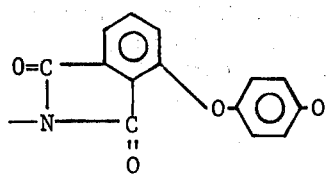

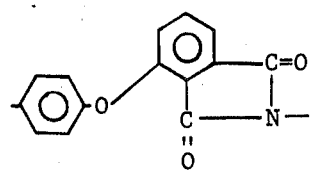

EXAMPLE 6

A mixture of 2.782 parts of 2,2-bis[4-(2,3-dicarboxyphenoxy)phenyl]propane, 2.782 parts of 2,2-bis[4-(3,4-dicarboxyphenoxy)phenyl]propane, 1.982 parts of 4,4'-diaminodiphenylmethane, 60 parts of phenol and 10 parts of toluene was heated to reflux for 2 hours. During the reaction the water formed was continuously removed azeotropically. The reaction mixture was poured in methanol and white fibrous polymer was collected by filtration. The yield of the polymer was 6.4 parts (94%). The material had a glass transition temperature of 227°. Based on the method of preparation the polymer consisted essentially of the following repeating units The above examples show only a few of the very many polyetherimides which can be made in accordance with the practice of the present invention. It should be understood that the present invention is broadly directed to a method for making polyetherimides involving the employment of tetra-acid of formula I and organic diamine of formula II.

What we claim as new and desire to secure by Letters Patent of the United States is:

1. In the method for making polyetherimide in a stepwise manner involving the steps of
   1. effecting reaction at ambient temperatures in the presence of an organic polar solvent between a tetra-acid of the formula

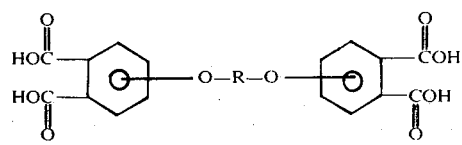

and an organic diamine of the formula $$H_2NR^1NH_2$$

to produce a polyamide acid, and 2. heating the polyamide acid of (1) to a temperature of at least 200°C to produce a polyetherimide, which comprises the improvement of reacting the tetra acid and the organic diamine of (1) in the presence of a non-polar or phenolic solvent at a temperature of at least 130°C, whereby the requirement of forming the polyamide acid in a polar organic solvent at ambient temperatures is avoided, where R is a member selected from the class consisting of (a) the following divalent organic radicals:

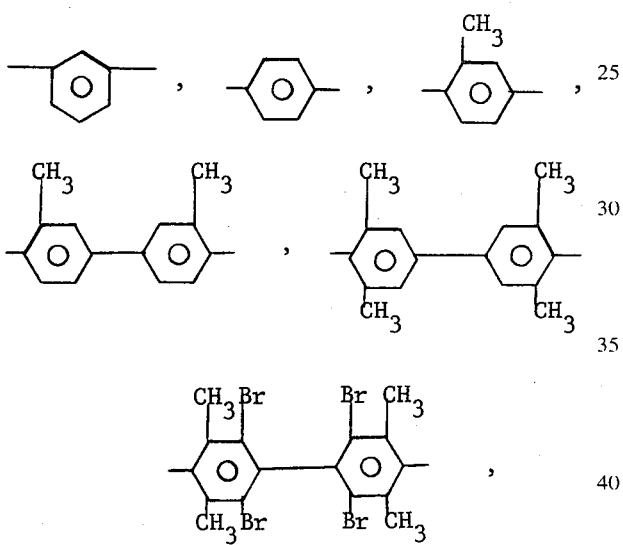

and

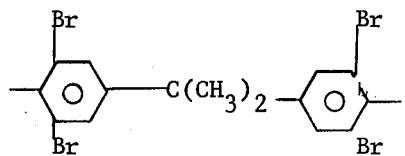

and (b) divalent organic radicals of the general formula

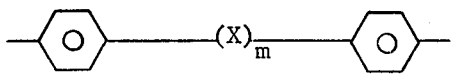

where X is a member selected from the class consisting of divalent radials of the formulas $-C_yH_{2y}-$,

$-O-$ and $-S-$ where $m$ is 0 or 1, $y$ is a whole number from 1 to 5, and $R^1$ is a divalent organo radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula

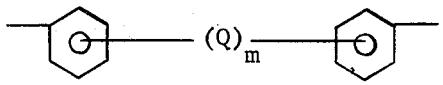

where Q is a member selected from the class consisting of $-O-$,

$-S-$, $-C_xH_{2x}-$ and $x$ is a whole number from 1 to 5 inclusive, and $m$ is as previously defined.

2. A method in accordance with claim 1, using a mixture of a phenolic solvent and a low boiling azeotropic solvent.

3. A method in accordance with claim 1, using a mixture of a non-polar solvent and a low boiling azeotropic solvent.

4. A method in accordance with claim 1, where the tetra-acid is 2,2-bis[4-(3,4-dicarboxyphenoxy)phenyl]-propane.

5. A method in accordance with claim 1, where the tetra-acid is 2,2-bis[4-(2,3-diccarboxyphenoxy)-phenyl]propane.

6. A method in accordance with claim 1, where the tetra-acid is 4,4'bis(3,4-dicarboxyphenoxy)diphenyl sulfide.

7. A method in accordance with claim 1, where the tetra-acid is 1,4-bis(3,4-dicarboxyphenoxy)benzene.

8. A method in accordance with claim 1, where the tetra-acid is 4,4'-bis(2,3-dicarboxyphenoxy)diphenyl ether.

9. A method in accordance with claim 1, where the organic diamine is bis(4-aminobutyl)tetramethyl disiloxane.

10. A method in accordance with claim 1, where the organic diamine is 4,4'-diaminodiphenylether.

11. A method in accordance with claim 1, where the organic diamine is 4,4'-diaminodiphenyl methane.

12. A method in accordance with claim 1, where the organic diamine is hexamethylene diamine.

13. A method in accordance with claim 1, where the organic diamine is m-phenylene diamine.

* * * * *